United States Patent [19]

Tamai

[11] 4,227,452

[45] Oct. 14, 1980

[54] PRINTING MACHINE

[75] Inventor: Masayoshi Tamai, Ebina, Japan

[73] Assignee: Fuji Xerox Co., Ltd., Tokyo, Japan

[21] Appl. No.: 951,205

[22] Filed: Oct. 13, 1978

[30] Foreign Application Priority Data

| | | | |
|---|---|---|---|
| Oct. 14, 1977 | [JP] | Japan | 52-122317 |
| Oct. 14, 1977 | [JP] | Japan | 52-122319 |
| Oct. 14, 1977 | [JP] | Japan | 52-122320 |

[51] Int. Cl.[3] .......... B41F 9/00; G02B 5/30

[52] U.S. Cl. .......... 101/1; 101/DIG. 13; 101/154; 101/170; 346/101; 346/153

[58] Field of Search .......... 101/1 R, DIG. 13, 170, 101/122, 13, 426, 153, 154, 157, 169; 346/153-155, 101

[56] References Cited

U.S. PATENT DOCUMENTS

| | | | |
|---|---|---|---|
| 3,495,268 | 2/1970 | Hurst | 101/DIG. 13 |
| 3,654,864 | 4/1972 | Ovshinsky | 101/170 X |
| 3,662,396 | 5/1972 | Brown, Jr. | 346/154 |
| 3,687,072 | 8/1972 | Pym | 101/170 X |
| 3,801,315 | 4/1974 | Gundlach et al. | 101/170 X |
| 3,812,495 | 5/1974 | Venner | 346/101 |
| 3,834,301 | 9/1974 | Croquelois | 101/1 |
| 3,843,955 | 10/1974 | Pear, Jr. | 346/101 X |
| 3,958,251 | 5/1976 | Borelli | 346/154 |

OTHER PUBLICATIONS

"High Speed Printer Mechanism," IBM Tech. Discl. Bulletin, vol. 1, No. 1, Jun. 1958, p. 7.

"Liquid Ink Imaging System," Xerox Disclosure Journal, vol. 2, No. 5, Sep./Oct. 1977, pp. 7-8.

"Double Roll Liquid Ink Induction Imaging System," Xerox Disclosure Journal, vol. 2, No. 2, Mar./Apr. 1977, pp. 23-25.

*Primary Examiner*—Eugene H. Eickholt

*Attorney, Agent, or Firm*—Sughrue, Rothwell, Mion, Zinn and Macpeak

[57] ABSTRACT

A printing machine comprising a cylindrical applicator has a spiral groove formed on the peripheral surface and is rotatable. A doctor blade used to wipe away excess ink and to insure adequate ink in the grooves. Electrodes are provided opposite the groove and paper is fed at a speed slower than the rotating peripheral speed of the applicator. A voltage related to the character to be printed is sequentially fed to the opposite electrodes to attract ink in the groove with the paper and print the character. In another embodiment a plurality of applicators are used with each applicator having a counter electrode having a stylus electrode array. As voltages are applied to the array the ink in the adjacent groove swells and contacts the paper. The voltages are staggered between the two electrode arrays. In a third embodiment, using multineedle electrodes raises the ink electrostaticly to the top portion of the applicator. The ink is transferred from the top of the applicator on to an image transferring roll and thereafter on to the recording paper. A fourth embodiment uses spiral back electrodes disposed on the rear surface of a paper carrying drum. The drum and the applicator are rotated at the same peripheral speed so that the position of the drum relative to the grooves on the applicator will vary for each revolution.

20 Claims, 42 Drawing Figures

PRINTING MACHINE

BACKGROUND OF THE INVENTION

This invention relates to a printing machine which directly prints a character or figure on recording paper in accordance with an electric signal.

There is, heretofore, widely known a so-called ink jet printing machine for ejecting liquid ink to effectuate printing. The recording speed of a ink jet printing machine depends upon the speed at which the recording ink droplet is formed as a character and the relative moving speed of a nozzle for producing the ink droplet with respect to the recording paper.

In the prior art it is generally recognized that the maximum speed for the recording ink droplet to be formed is approximately 1 MHz even by using a charged amount control system of the fastest printing speed in all the systems. The relative moving speed of the nozzle depends upon the structure and configuration of the nozzle. The acceleration of the nozzle is limited due to the mechanism in such a system for reciprocatingly moving the nozzle on a rectilinear line and for moving the recording paper perpendicularly with regard to the nozzle.

Therefore, a so-called a multi-nozzle system has been proposed for disposing a number of nozzles perpendicularly with respect to the feeding direction of the recording paper. The aforementioned charged amount control system uses single nozzles that are aligned in large numbers in a parallel arrangement. This causes the cost of such a system to become expensive.

Since the recording ink droplet flies in the space between the recording paper and a nozzle, high accuracy is required for the disposition of the recording paper at sequential timing with regard to the recording ink droplet formation timing. A printing machine construction is disclosed in Japanese Patent Laid-Open No. 9622/1973 wherein ink is injected as required in accordance with a pressure pulse. It is considered to be a difficult problem to align the perforations of a great number of fine holes at a high density corresponding to the recording density. Furthermore, since the droplets of recording ink must fly across the distance between the recording paper and the injecting nozzle, high precision timing between the formation of the droplets and the instantaneous position of the recording paper is required. This is because, when a character or the like is exhibited as a collection of image elements, a high quality reproduction of the character or the like cannot be obtained unless the ink droplets constituting the image elements are always positioned correctly on the recording paper.

Considering the quality of the prints on the recording paper, since the injecting type printing device in which ink is injected through fine holes, this requires the use of a low viscosity which ink quickly diffuses into the paper tissue upon arrival on the surface. This tends to produce features such as producing low grade printing having much blur and of a low reflection density. Hence, such systems have many disadvantages.

Also, an ink jet printing machine for ejecting a liquid ink has features that allow halftone color to be printed at relatively high speed. However, in order to reproduce natural color, many important difficulties have existed in the printing technology. One of problems resides in the ink. In normal printing process, an ink including a solvent, pigment, etc. is transferred onto a recording paper so that the surface of the ink is dried with a resin layer due to its evaporation or bridge formation among molecules by the exposure of ultraviolet rays for solidification. In color printing, three plates for dots of three primary colors such as cyan, magenta and yellow separated from the original picture are used to print with three primary color inks of cyan, magenta and yellow. Since the ink is ejected from the fine hole in an ink jet printing machine, the ink is easily evaporated and dried which tends to block the ink supply system such as nozzles or the like and tends to evaporate a great deal of solvent resulting in difficulty in usage.

SUMMARY OF THE INVENTION

It is, therefore, one object of this invention to provide a printing machine which can use ink of similar or equivalent composition to the printing ink used for faithful color printing.

Another object of this invention is to provide a compact and less expensive printing machine which can faithfully obtain a color hard copy in hue.

It is another object of this invention to provide an improved printing apparatus that can record letters and figures directly on commonly used paper and can operate at high speed.

Yet another object of this invention is to provide a printing device that is small in size and low in cost, yet obtain high quality printing of characters and the like.

A further object of this invention is to provide a printing machine that can print at high speed utilizing the advantages of direct printing.

This invention enables the use of ink of equivalent or similar composition to that of a printing ink by a skillful combination of a polarity ink developing system utilizing the phenomenon that liquid ink is polarized by means of electrostatic induction. It is attracted and moved by the technique of electrostatic attraction. The technique uses electrodes disposed on the back of a recording paper in an electrostatic recording.

This invention uses a cylindrical applicator having grooves formed on the peripheral surface. The grooves are generally helical although in one embodiment circumferential grooves are employed. A doctor blade is used to wipe away excess ink and to ensure an adequate ink supply in the grooves. Electrodes are provided on the back sides of the paper to be printed and a voltage related to the character to be printed is sequentially fed to the electrodes to attract the ink and print the character. In one embodiment, a plurality of application rolls are employed using counter electrodes having an array of stylus elements. The voltages are staggered between the arrays to alternate the printing cycle. Another embodiment employs multineedle electrodes wherein the ink is transferred from the top of the applicator to an image transferring roll and then onto the recording paper. A final embodiment of the invention uses grooves for ink transfer formed as helical elements by a wire wrapped on an applicator drum. The paper to be printed is mounted for rotation on a drum carrying back electrodes formed as spirals insulated from each other.

This invention will be described with reference to these embodiments and the drawings that follow.

BRIEF DESCRIPTION OF THE DRAWINGS

FIG. 14 B shows the position of the dots marked on the recording paper;

DESCRIPTION OF THE PREFERRED EMBODIMENTS

Figure 1:
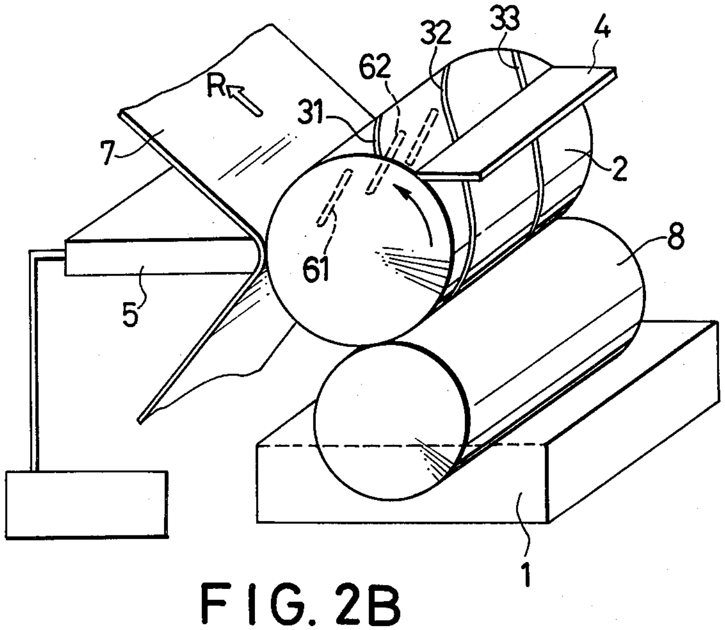
FIG. 1 is a perspective view showing the schematic constitution of one preferred embodiment of this invention.

Referring now to FIG. 1, a schematic view of one preferred embodiment of this invention is shown. An ink tank 1 is filled with ink therein. A roll-like applicator 2 includes a number of spiral grooves (recesses) 31, 32, et seq. formed on the peripheral surface thereof as will be hereinbelow described, and ink of a suitable amount filled in the grooves. A doctor blade 4 is used for scraping the excess ink in the grooves 31, 32 formed on the peripheral surfaces of the applicator 2 to a suitable amount therein. Opposite or back electrodes 5 include a plurality of opposite electrodes 61, 62, . . . arranged along the axis of the applicator roll opposite the applicator 2. Recording paper 7 is fed at a speed slower than the peripheral speed of the applicator 2 between the applicator 2 and the opposite electrode means 5. An ink imparting roll 8 is employed for applying the ink from the tank 1 to the applicator 2.

Figure 2B:
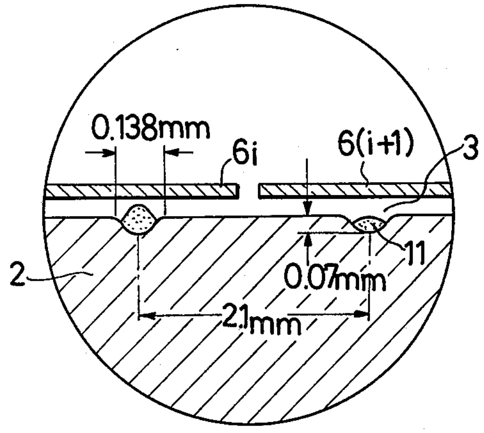
FIGS. 2A and 2B are views describing the relationship between the applicator roll and the opposite electrodes.
Figure 2A:
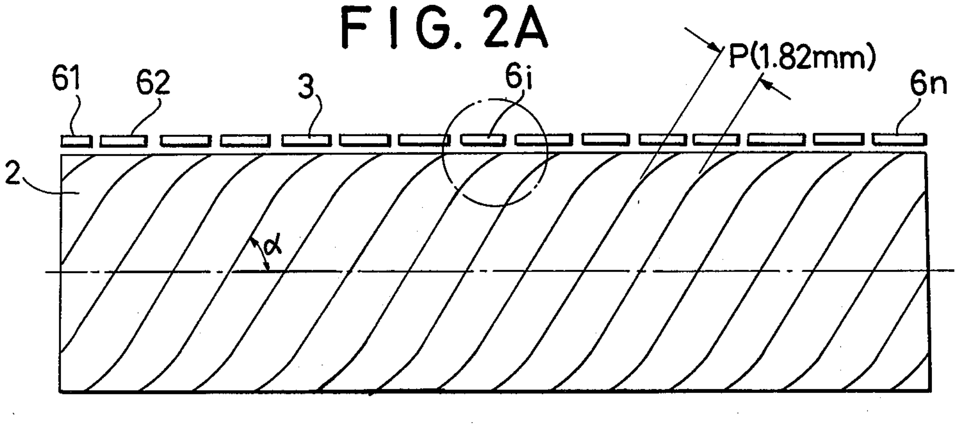

FIGS. 2A and 2B are schematic views for explaining the position relationship between the respective electrodes 61, 62, . . . 6i, . . . in the opposite electrode means 5 and the grooves 3 on the peripheral surface of the applicator 2. Also shown in FIG. 2B are some typical dimensions for the grooves.

Figure 3A:
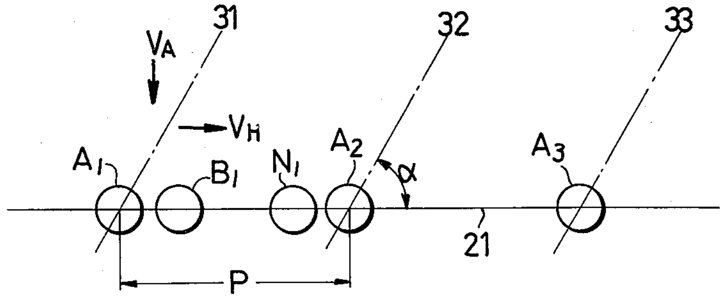
FIGS. 3A and 3B are views describing the printing principle of the picture element dots.

In FIG. 3A, the grooves 3 are formed to be at an angle $\alpha$ with respect to the bus line (or axial direction) of the cylindrical shape of the applicator 2 as one example so that the pitch (interval) between the adjacent grooves is designated by p. The applicator 2 is positioned to be opposite to and in slight contact with the recording paper 7 in such a manner that the peripheral speed of the applicator 2 is several times faster than the feeding speed of the recording paper 7.

The printing operation of the printing machine according to this embodiment of the invention is as follows: The ink accumulated in the ink tank 1 will excessively adhere in the grooves 3 of the applicator 2 by means of the roll 8. The ink thus adhered in the grooves 3 of the applicator 2 is scraped off by the doctor blade 4 so that a suitable amount of ink is retained in the grooves 3. The doctor blade 4 serves also to simultaneously remove the ink adhering onto the surface of the applicator 1 except that in the grooves 3. Hence, ink will not adhere to the recording paper 7 when the surface of the applicator 2 is brought into contact with the paper 7. It is to be noted that the doctor blade 4 may be provided in more than two sheets in response to the respective functions thereof.

The opposite electrodes 61, 62, . . . are disposed substantially perpendicular to the feeding direction (as designated by an arrow R in FIG. 1) of the recording paper 7. The opposite electrode 5 located at the back of the recording paper 7 as will be hereinafter described in greater detail. If a high voltage is applied in response to the document signal between the selected electrodes of the opposite electrode means 5 and the applicator 2, the ink 11 (in FIG. 2B) in the grooves 3 of the applicator 2 is polarized by means of electrostatic induction so that it is attracted toward the opposite electrode by the electrostatic attraction between the charges on the opposite electrodes. Thus, the ink will adhere to the predetermined position of the recording paper 7 so that picture element dots are printed thereon.

Referring to FIG. 3A, the printing method of the picture element dots will be further described in detail. Assuming now that the applicator 2 is rotated at a constant peripheral speed $V_A$ and a tangent 21 with the applicator 2 on the opposite electrode means 5 (or imaginary bus line on the peripheral surface on the applicator 2) is oriented so that the cross points A1, A2, A3, . . . between the rectilinear line 21 and grooves 31, 32, . . . are provided, these points become the dot positions printed on the recording paper 7 at the instantaneous moment. Since the grooves 31, 32, . . . are rotated as the applicator 2 rotates, the cross points A1, A2, . . . are rotated clockwise at the speed $V_H$ on the rectilinear line 21.

The speed $V_H$ is derived of the following equation:

$$V_H = V_A / \tan \alpha$$

The time when the cross point A1 is moved to the position A2 and when the cross point A2 is moved to the position A3 is designated by the following equation:

$$p/V_H=(p \tan \alpha/V_H)$$

Figure 3B:
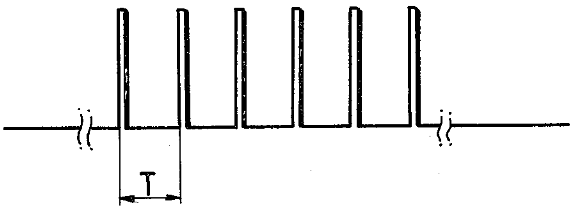

Assuming now that the cross points of each time T (see FIG. 3B) as derived of the following equation from the point A1 on the imaginary bus line 21 are designated by B1, C1, . . . N1, $$T=1/N(p \tan \alpha/V_H)$$

the cross points by the respective grooves 31, 32, . . . are superimposed with each other from (N+1)th. The time when one groove, such as, for example groove 31 passes, accordingly, the points A1, B1, . . . N1, A2, B2, . . . is designated by pulses to form a timing chart. This is indicated in FIG. 3B, and the pulse period becomes equal to the time T.

Figure 4A:
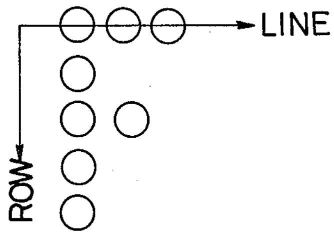
FIG. 4A is an example of a letter printed by the dot method.
Figure 4B:
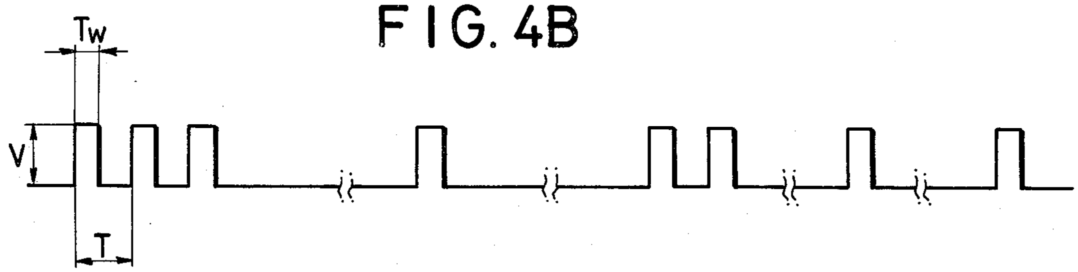
FIG. 4B is a view showing one example of voltage applying timing and printing operation.

According to the principle of this invention, the timing chart of the applied voltage in the case of printing the letter "F" is illustrated in FIG. 4A. The printed dots are shown in FIG. 4B. The recording paper 7 is stopped until the dot printing of one line is completed, and the line is transferred while the paper 7 is not printing, i.e., the picture elements are moved from one line to next line. The recording paper is moved within the integer times of $V_A/\tan \alpha$ and the printing operation is periodically started, always from the determined raw to a new line. That is, the printing operation and paper feeding operation are alternatively sequentially repeated. In this case, the applied voltage waveform need not necessarily be rectangular as shown in FIG. 4B. The voltage level V and its width Tw are essential factors for developing parameters, i.e., the peripheral speed of the applicator, and viscosity of the ink. Generally, when the peripheral speed of the applicator and viscosity of the ink tend to be small, the voltage level or width may be small.

Figure 5:
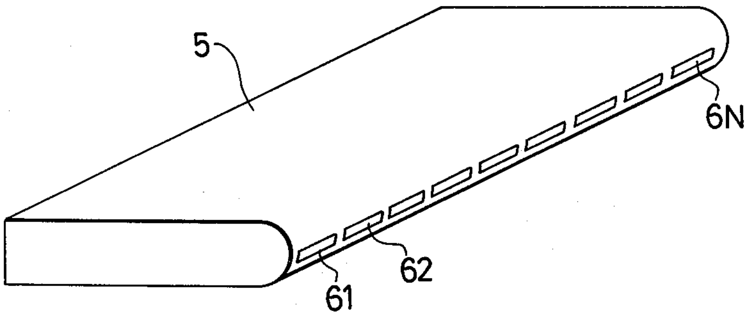
FIGS. 5 and 8 are views of the arrangements of the opposite electrodes.

The important number of opposite electrodes for executing this invention will now particularly be described in detail. One example of an opposite electrode 5 is shown in FIG. 5. The number of divided opposite electrodes 61, 62, . . . 6N are set to be at least twice the number of contacts of the grooves 31, 32, . . . on the peripheral surface of the applicator 2 and the recording paper 7. This will be described with reference to FIG. 6.

Figure 6A:
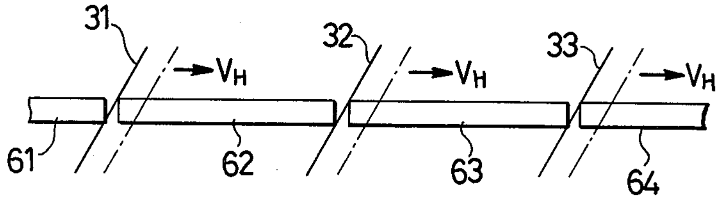
FIGS. 6A and 6B are views explaining the operation of the divided opposite electrodes.

FIG. 6A shows the position relationship between the opposite electrodes and the grooves in case where the number of the contact points of the grooves 31, 32, . . . with the recording paper 7 is the same as that of the opposite electrodes 61, 62, . . . 6N. In this case, the length of the respective opposite electrodes 61, 62, . . . become substantially equal to the pitch p of the grooves. When the respective grooves cross in the vicinity of the ends of the respective opposite electrodes, such as, for example, when the dot printing is conducted between the electrode 62 and the groove 31, the printing may sometimes be simultaneously executed between the electrode 62 and the groove 32. Since the respective grooves are moved to the right of the drawing at the speed $V_H$, a difficulty exists in that the dot printing is not performed originally between the groove 31 and the electrode 62 due to a slight variation of the timing. Rather the printing is conducted only between undesired groove 32 and the electrode 62.

Figure 6B:
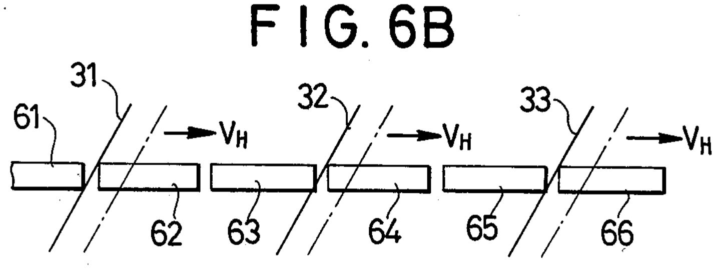

On the other hand, as shown in FIG. 6B, since two opposite electrodes exist between the pitch p of the grooves in case the number of the opposite electrodes is twice the number of the contacts of the grooves with the recording paper, the aforementioned difficulty is eliminated. More particularly, even alternate opposite electrodes may be selected in this case to apply the voltage responsive to the picture signal so that even if the groove 31 is, for example, crossed at the end of the opposite electrode 62, the voltage will not be applied to the adjacent electrodes 61, 63. The result is that no dot printing takes place at the undesired position. It is to be noted that the number of divided opposite electrodes may be more than the multiple of two.

In case the recording paper 7 is not stopped during printing of one line but is continuously fed, the respective opposite electrodes 61, 62, . . . are disposed obliquely with respect to the tangent 21. This arrangement will correct the strain of printing due to the feeding of the recording paper. This method will now be described.

Figure 7:
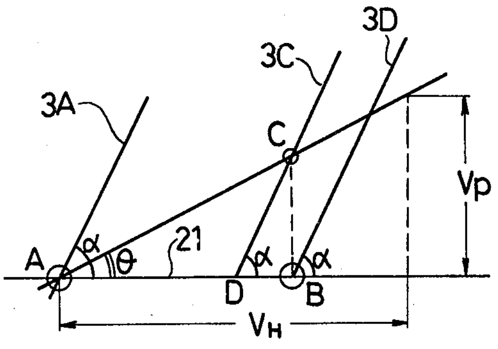
FIG. 7 is a view describing the arrangement of the opposite electrodes in case the recording paper is continuously fed during printing.

Assume that the feeding speed of the recording paper 7 is designated by $V_p$. The moving speed of the groove 3 of the applicator 2 in the axial direction per unit time is $V_H$ as described above. If the respective opposite electrodes are inclined at an angle $\theta$ represented by the following equation:

$$\tan \theta = Vp/V_H$$

it will be readily seen in FIG. 7 that the cross points between the grooves and the electrodes, i.e., the dot printing points are moved upon following to the feeding of the recording paper to cause no printing strain to take place.

Figure 8:
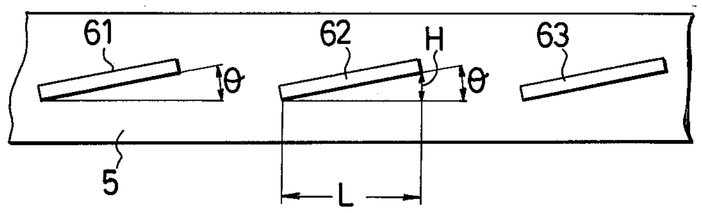

FIG. 8 shows an example of the disposition of the respective opposite electrodes 61, 62, et.seq. when inclined. The length L of the respective opposite electrodes in the tangent 21 direction and the inclination H thereof toward the right angle thereto are determined primarily by the sizes of the applicator 2 and the opposite electrodes 5. The applicator 2 and opposite electrodes are geometrically brought in slight contact with the tangent so that the distance therebetween is increased as they are separated further from the tangent. However, if the interval between the applicator and the opposite electrodes is less than a certain value, it may be regarded as equivalent to the case where both contact with each other from the point of attraction and printing actions of the ink. Hence the regions are regarded as equivalent and exist at both sides of the tangent with a predetermined width.

In for example the case where the diameter of the applicator 2 is 25 mm and the radius of curvature of the back electrode is 60 mm, this width becomes approx. 1 mm. Since preferred printing quality is not obtained except these regions, it is clear that the inclined amount H of the opposite electrodes 61, 62, . . . should be set smaller than this width. Also, the inclined amount H also depends upon the pitch in the feeding direction of the picture elements to be printed on the recording paper.

Certain opposite electrodes are located in the range of AB in FIG. 7 and if printing is conducted from one end to the other of the range, the recording paper 2 is moved by the amount as designated by BC. Hence, the picture elements to be printed next must separate by the least amount BC. Accordingly, the inclined amount H, i.e., the length L of the electrodes in tangent direction must be determined so that the distance BC should not become larger than the pitch at the feeding direction of the picture elements on the recording paper. Finally, the size of the respective opposite electrodes thus inclined is determined by the $\theta$ and H as described above. As in the foregoing description, the opposite electrodes 61, 62, . . . not inclined, are provided in the direction of rectilinear line AB in FIG. 7 of the tangent 21. The opposite electrodes inclined are provided in the direction of a rectilinear line AC.

The case where the opposite electrodes are not inclined and the electrodes are inclined will now be described in term of the voltage application timing.

In FIG. 7, three parallel rectilinear lines 3A, 3C and 3D indicate the positions of the grooves 3 of the applicator 2 at different times from each other. Assume that points A and B are adjacent printing dot positions in one line. Since the opposite electrodes are disposed on the line AB while the recording paper is intermittently fed, the voltage may be applied when the groove is located at the position 3D and when the voltage is applied while the groove is located at the position A. Meanwhile, when the recording paper is continuously fed, the opposite electrodes are disposed on the line AC. Since the position of dots to be printed on the tangent 21 is always constant, the point of applying the voltage in this case must be when the cross point D between the vertical line from the point B on the rectilinear line AB and the rectilinear line AC crosses the groove. More particularly, the voltage must be applied at the position 3C. The relationship therebetween in this case becomes as follows:

$\tan \alpha = BC/BD$ $\tan \theta = BC/AB \because BC = BC/\tan \alpha = AB \tan \theta/\tan \alpha$ Therefore, the timing of the applying voltage must be altered by $T(\tan \theta/\tan \alpha)$ as to the respective electrodes.

Figure 9A:
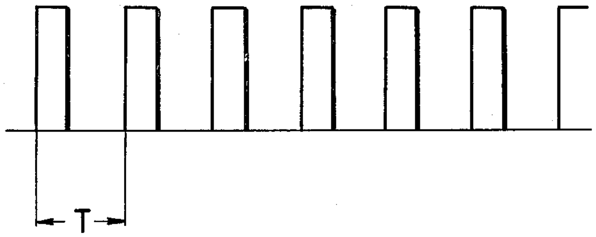
FIGS. 9A and 9B are timing charts of the applied voltage.
Figure 9B:

FIG. 9 show the timing in case four voltage pulses are applied while the groove 3 passes one opposite electrode. FIG. 9A shows the case of opposite electrodes located on the tangent 21, and FIG. 9B shows the case of opposite electrodes disposed obliquely along the rectilinear line AC.

Figure 10:
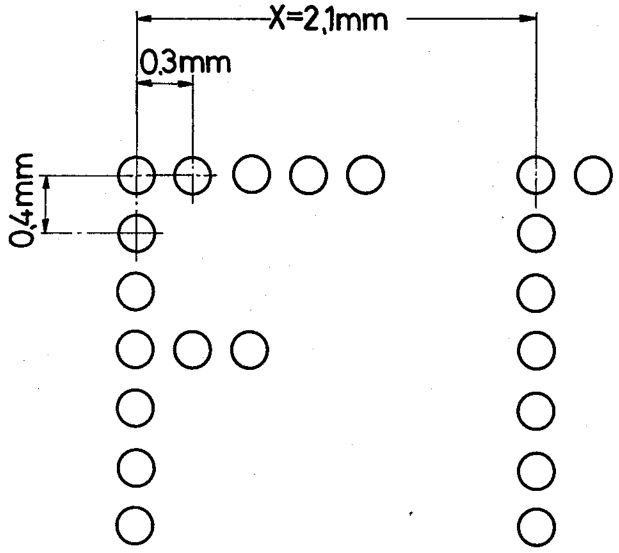
FIG. 10 is a view showing one experimental example of dot printing according to this invention.

In the experimental example, the grooves were formed at 60° with respect to the axial direction of the applicator 2, and the pitch between the grooves taken vertically with respect to the line along the groove was 1.82 mm. One groove was 120μ in width and 70μ in depth. The pitch, width and depth of the groove measured axially were 210 mm, 138 and 70μ, respectively (See FIG. 2B). The applicator roll rotated at the peripheral speed of 260 mm/sec. In this experiment, one example of the picture element character printed is shown in FIG. 10. The longitudinal and lateral pitches of the picture elements are 0.4 and 0.3 mm, and the pitch X to be printed of the character was seven times the picture element pitch. The period of applying the voltage in case the recording paper was intermittently moved was executed by 2 m.sec. in accordance with the following calculating formula:

$$0.3/V_A/\tan 60° = 2 \times 10^{-8} \text{ (sec.)}$$

The situation where the recording paper is continuously fed will now be described in detail. Since the pitch of the grooves of the applicator 2 and arrangement of the characters are 2.1 mm, the arrangement density of the grooves provided on the applicator is designed so that the respective characters is for one groove. That is, when the groove is moved axially to reach the initial picture element position of the adjacent character, it coincides therewith when the recording paper is continuously fed by the longitudinal pitch of the picture elements. More particularly, (The time when the recording paper is fed by 0.4 mm) = (The time when the groove is moved by 2.1 mm)

$$0.4/Vp = 2.1/260/\tan 60°$$

$$\therefore Vp = 28.6$$

The inclination of the electrodes is:

$$\tan \theta = Vp/V_H$$

$$\therefore \theta = 10.8°$$

The electrode is configured in response to the size of the character to be formed as shown in FIG. 10. In this case, since there is a space between the characters for no printing, it is not necessary to provide twice the number of electrode pairs to the number of the grooves. The length of the opposite electrodes in the tangent direction was 1.5 mm, the width W of the electrodes in the perpendicular direction to the tangent 21 was 0.2 mm, the pitch Y provided at the opposite electrodes was 2.1 mm, and the inclined angle $\theta$ of the electrodes was 10.8°.

Figure 11:
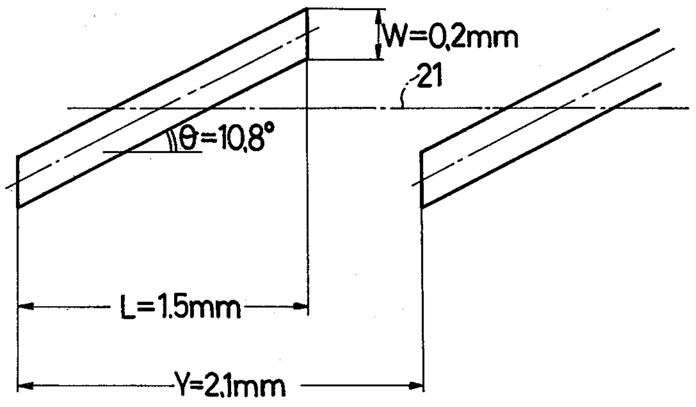
FIG. 11 is a view of arrangement of one preferred embodiment of the opposite electrodes.

In FIG. 11, the respective parts are drawn in expanded manner for the convenience of description. The applicator 2 used for the above experimental example was formed with the grooves in soft iron of 25.4 mm in diameter according to prior art methods. The configuration of the grooves were as described above. The doctor blade 4 was made of synthetic rubber with a metallic plate adhered thereto. The ink was formulated by mixing carbon black for pigment in dispersion in fluid paraffin with a viscosity of 300 cps. The recording paper 7 was common paper not subjected to any treatment. Since the peripheral speed of the applicator 2 was not equal to the feeding speed of the recording paper 7, slip occurred in response to the speed difference therebetween. If the slip was not uniform, a strain occurred in the recording paper to decrease the quality of the character on the paper. The voltage used for the development was 800 volts. The switching of the voltage was conducted by the conventional high speed switching circuit, but when this machine is used as a line printer, the number of the electrodes required corresponds to the number of characters in one line.

This invention can be set by varying the parameters of various processes. In case the characters are printed in the same manner as the experimental example, if the period of applying the voltage is determined to 2 msec. when the angles of the grooves of the applicator are 45° and 75°, the pitches between the grooves become 1.48 mm and 2.01 mm, and the peripheral speeds of the applicator become 150 mm/sec. and 556 mm/sec., respectively. Since the electric field by the opposite electrodes acts in response to the distance of the grooves of the applicator in the ink, better action can be obtained if the angle of the grooves are larger. However, since the electric field by the electrodes of limited width must act while the ink is attracted and moved, it is noted that the peripheral speed of the applicator must also be limited.

Referring now to FIGS. 12–15 a variation of the invention is shown using the polarized ink development and the phenomenon where liquid ink is polarized by electrostatic induction and moved by electrostatic attraction. The signal voltage application uses a multistylus electrode to cause the ink in the grooves to swell when signal voltages corresponding to the character to be recorded are applied.

Figure 12:
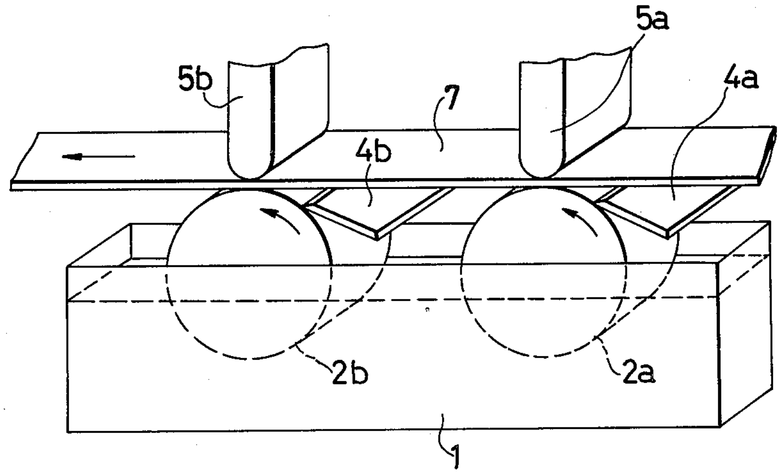
FIG. 12 is a schematic perspective view showing a second embodiment of this invention.

FIG. 12 is a schematic view showing this embodiment of a printing machine according to the present invention, in which, as in the prior embodiment, reference numeral 1 designates an ink tank containing ink therein and the numerals 2*a* and 2*b* are roll-shaped applicators each formed in its surface with a plurality of recesses or grooves for containing therein a proper amount of ink. Doctor blades 4*a* and 4*b* are used for metering the ink in the grooves to a proper amount. Counter electrodes 5*a* and 5*b* face the surface of the respective applicators 2*a* and 2*b* and each have a plurality of styli arranged axially to the applicators. A recording paper 7 runs between the applicators 2*a* and 2*b* and counter electrodes 5*a* and 5*b* at a speed equal to the peripheral speed of the applicators.

Figure 13:
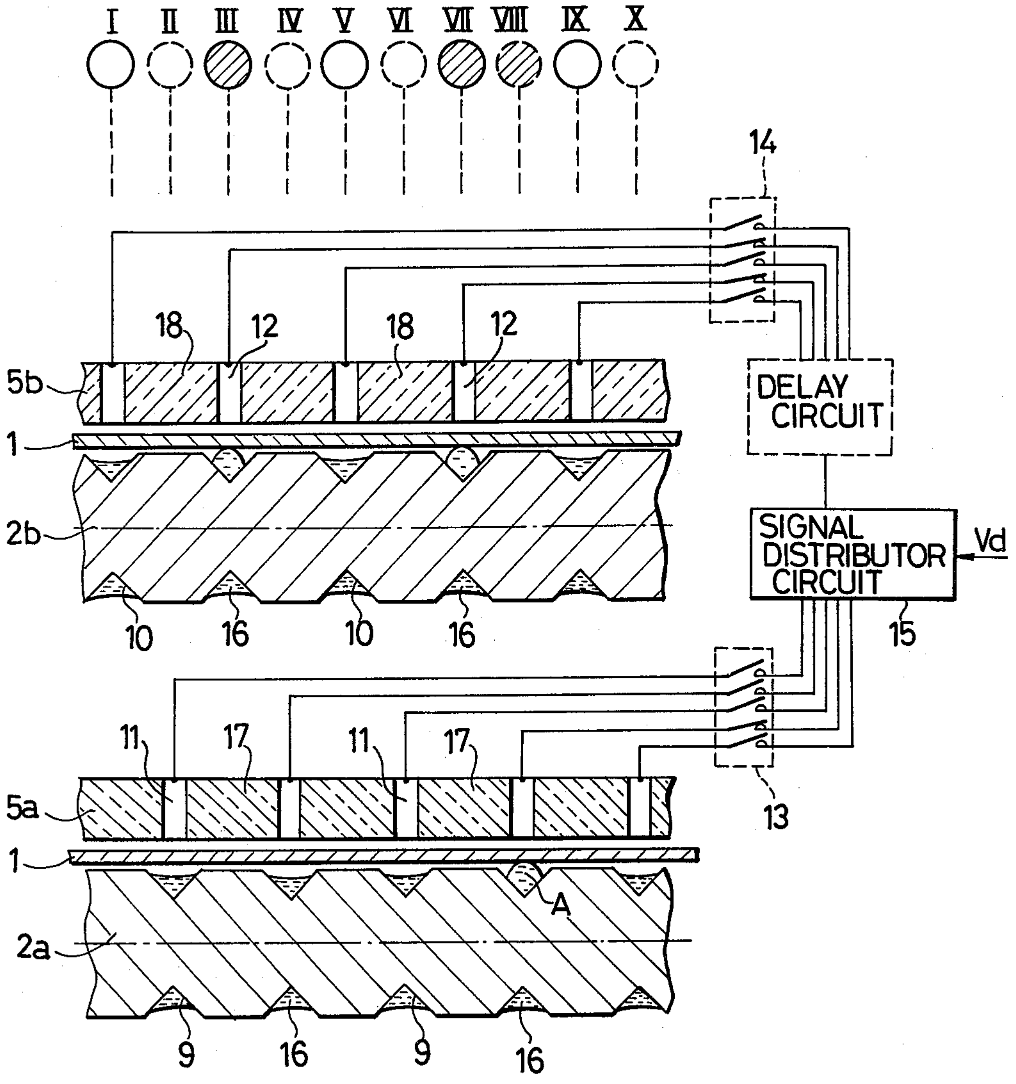
FIG. 13 shows the relationship between the styli of the counter electrodes and the grooves in the surface of the applicators.

FIG. 13 shows the relationship between the styli of the counter electrodes 5*a* and 5*b* and the grooves in the surface of the applicators 2*a* and 2*b*. The counter electrodes 5*a* and 5*b* each have a plurality of styli 11, 12 electrically insulated from each other by insulators 17, 18 and facing the grooves 9, 10 in the surface of the applicator 2*a*, 2*b*. The styli 11 and 12 are connected through respective switch circuits 13 and 14 to a high voltage signal distributor circuit 15 which is adapted to receive image signals Vd and distribute high voltages to the styli 11 and 12. The ink employed is preferably electrically conductive.

The operation of the printing machine of this embodiment will now be described. When the applicators 2*a* and 2*b* rotate in the direction indicated by the arrow with the ink 16 maintained in the grooves 9 and 10, the doctor blades 4*a* and 4*b* meter the ink 16 in the grooves 9 and 10 to a predetermined level. Signal voltages applied to the styli 11 of the counter electrode 5*a* cause electrostatic induction to polarize the ink in the groove 9 so that the ink surface swells toward the styli 11 as shown in FIG. 13 by the reference letter A, whereby ink dots are marked in the recording paper.

In this embodiment, even-numbered ink dots as shown by the broken lines in FIG. 13 are marked on the recording paper when the recording paper 7 passes between the applicator 2*a* and the counter electrode 5*a*. Odd-numbered ink dots as shown by the solid lines in FIG. 13 are marked thereon when the recording paper further advances between the applicator 2*b* and the counter electrode 5*b* so as to establish a line of printing. In the illustrated embodiment, the 8th ink dot is marked on the recording paper 7 in the first printing operation accomplished by the applicator 2*a* and the counter electrode 5*a* and the 3rd and 7th ink dots are marked thereon in the second printing operation accomplished by the applicator 2*b* and the counter electrode 5*b*, resulting in the 3rd, 7th, and 8th ink dots marked in a line.

The high voltage signal distributor circuit 15 is adapted to classify a line of input image signals into even-number and odd-number signals and apply the even-numbered image signals to the styli 11 of the counter electrode 5*a* facing the first applicator 2*a* and the odd-numbered image signals to the styli 12 of the counter electrode 5*b* facing the second applicator 2*b* after a time required for the recording paper 7 to travel the distance between the counter electrodes 5*a* and 5*b*. This can be accomplished by a delay circuit or memory reading timing adjusting means well known in the art.

The grooves of one applicator should be separated apart from each other a distance sufficient to prevent the swelling of the grooves other than the groove corresponding to the stylus to which a signal voltage is applied. The ink in the unrequired grooves may be polarized by electrostatic induction if the electrostatic attraction is too low to attract the ink on the recording paper when the recording paper is in contact with the applicator.

Figure 14A:
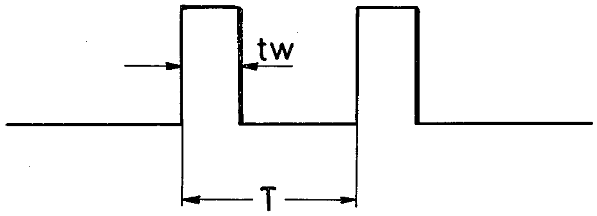
FIG. 14 A shows a pulse waveform.
Figure 14B:
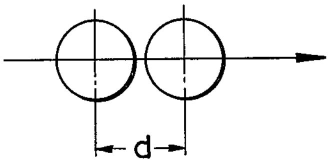

It is important in the present embodiment to close the switch circuits 13 and 14 for distributing the high voltage signals to the styli in a timed relation. FIG. 14A shows a pulse waveform wherein the reference letter T designates the pulse period. FIG. 14 shows the position of the dots marked on the recording paper with the reference letter d indicating the distance between the dots or the dot pitch and the arrow indicates the direction of travel of the recording paper. The pulse period T is determined by the recording paper travelling speed V and the dot pitch d as follows:

$$T = d/V$$

The pulse width tw is determined by the voltage level. As the pulse voltage is increased, the attraction force to attract the ink in the grooves 9 and 10 is increased and the ink swells more rapidly and higher so that the dots are marked on the recording paper in a shorter time. Thus, if the pulse voltage is high, the pulse width tw may be narrow with the result that the pulse period can be reduced and the recording paper running speed can be increased. It is to be understood that the pulse may be of any suitable waveform other than the rectangular pulse as illustrated in FIG. 14A. The pulse period T should be equal to the contact time of the applicator and the recording paper. The term "contact time" referred to herein is intended to mean the period when an electric field acts in a level effective to the ink in the grooves. It will be understood that the diameter of the applicator and the radius of curvature of the recording paper in contact with the applicator are also important parameters.

The present embodiment will be more clearly understood with reference to the following Example. Applicators 2*a* and 2*b* having a 25 mm diameter were made of soft iron and formed in their surfaces with grooves 9 and 10 having a 400 micron pitch and a 100 micron depth. The ink used was of a 50 cP viscosity and the recording paper 5 was fed at 260 mm/sec. The multistylus 11 and 12 used were of the type well known in the facsimile art. In this Example, a high quality print was obtained.

A higher speed printing operation can be attained by reducing the viscosity of the ink. For example, when the speed of travel of the recording paper 7 was increased to 2,000 mm/sec with the use of a 8 cP viscosity ink, a high quality print was obtained.

Figure 15:
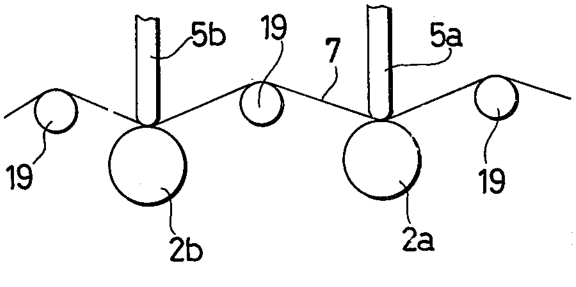
FIG. 15 is a schematic view showing an alternative embodiment according to the present invention.

It is well known that the shape and size of the dot to be marked on the recording paper has a great influence on the print-quality in printing letters and figures using dot patterns. In accordance with the present embodiment, the shape and size of the dots to be marked on the recording paper can be controlled in accordance with the applicator rotation speed, the shape and size of the grooves. The character of the ink used and also the shape and size of the dots can be varied by controlling the radius of curvature of the recording paper in contact with the applicator. FIG. 15 shows an example thereof which having tension rollers 19 before and after the applicators. The shape and size of the dots can be easily adjusted simply by adjusting the position of the tension rollers 19.

The above described printing machine arrangement according to this embodiment of invention provides the following advantages: First, it provides a higher speed printing and a proper print quality level by controlling the size and shape of the dots to be recorded on the recording paper. Second, it permits the use of ink having components similar to conventionally used ink to increase applicable colors. This permits multicolor printing by providing a plurality of printing units composed of an applicator and a counter electrode. Third, it is possible to increase the amount of the ink swelling to increase the density of the print by adjusting the shape of the grooves. Fourth, it provide an easy half-tone reproduction since the degree of the ink swelling varies depending on the amplitude and duration of the electric signals applied to the styli.

A third embodiment will now be described. In this embodiment an image transferring roll is employed. The embodiment will be described with respect to FIGS. 16–18.

Figure 16:
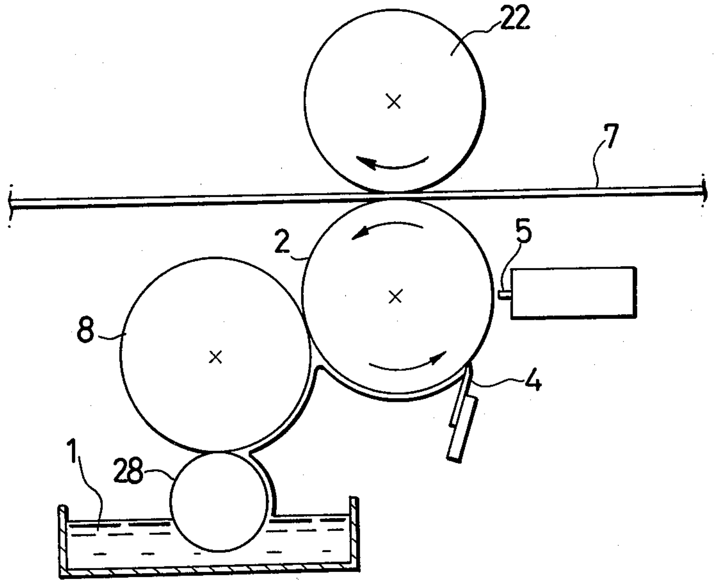
FIG. 16 is a diagram showing a general arrangement of a third embodiment of the invention.
Figure 17:
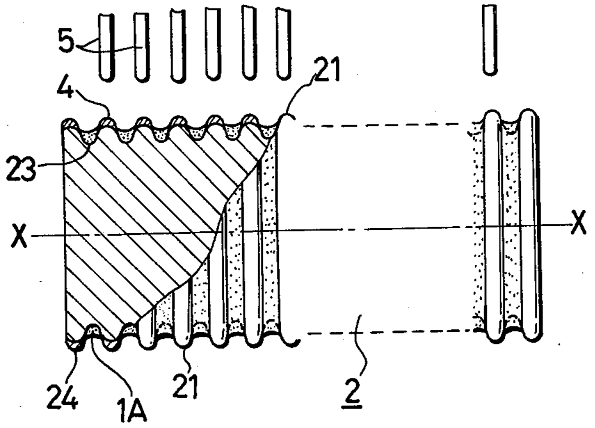
FIG. 17 is a sectional view showing one aspect of the embodiment.
Figure 18A:
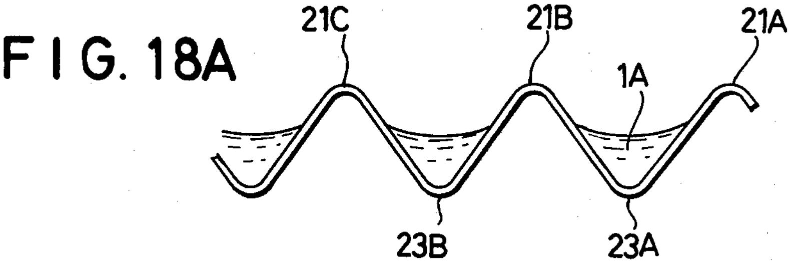
FIGS. 18A, 18B, 18C and 18D are diagrams showing the operation of the third embodiment.
Figure 18B:
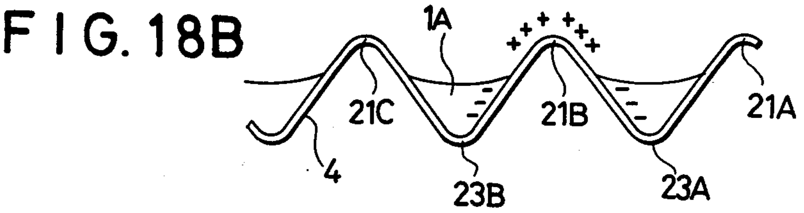
Figure 18C:
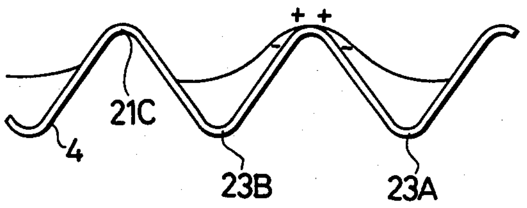
Figure 18D:
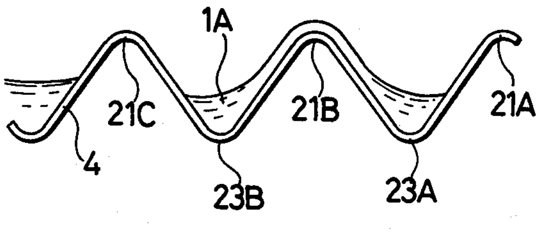

Referring now to FIG. 16 a third embodiment is shown with an ink tank 1 so as to maintain a liquid level. An applicator 2 as described herein is formed into a roll having a great number of projections and recesses on its surface and a predetermined amount of the ink being is kept in the recesses. Ink supplying rolls 8 and 28 which apply ink stored in the ink tank 1 on the surface of the applicator 2. A doctor blade 4 is used for scraping out excessive ink from the surface of the applicator 2 and leaving an appropriate amount thereof on the surface. A multineedle electrode assembly 5 (the electrode itself is widely known in the electrostatic recording technique) has needles disposed in opposition to the projections of the applicator 2. A sheet of the recording paper 7 is fed in contact with the applicator 2 at a speed equal to that of the periphery of the applicator 2, and a roll 22 is provided on the rear side of the paper 7 for pressing the same paper onto the applicator 2. FIG. 17 is a sectional view, partly in section, for illustrating one example of the construction of the applicator 2. As will be apparent therefrom a great number of projections 21 and a great number of recesses 23 are provided on the outer surface of the roll-shaped applicator 2. These projections 21 and recesses 23 may be formed in various ways, for example the helix of the first embodiment. A suitable example thereof may comprise a number of circumferential recesses or grooves each formed in a plane perpendicular to the rotating axis X—X of the applicator 2. In the bottom parts of the recesses 23, ink 1A will adhere or be stored to maintain a predetermined level. At least a part of each projection 21 starting from a position just below the liquid level and ending at the top of the projection is covered by an insulating body 24. The needles of the multineedle electrode 5 are disposed in opposition to the projections 21 of the applicator 2. It is desirable that the needles are located just above the tops of the projections 21.

The operational principle of the printing device according to the present invention will now described in detail with reference to FIG. 18. In this Figure, there is indicated an example wherein not only the projections 21A through 21C, but also the recesses 23A and 23B are covered by the insulating body 24. As described hereinbefore, ink 1A adjeres in the recesses 23A and 23B of the outer surface of the applicator 2. The liquid levels in the recesses of the ink 1A are maintained at a predetermined level, and the top parts of the projections 21A through 21C project upward from the liquid level (refer to FIG. 18*a*). The ink 1A is held at the ground potential.

Now it is assumed that the top part of the projection 21B is charged to the positive polarity by the needle opposing the projection 21B. Due to the electrostatic induction, the ink 1A nearby the projection 21B is polarized to the negative polarity (refer to FIG. 18*b*). As a result, an attractive force is created between the positive charge in the top part and the negative charge induced in the ink 1A, and the liquid levels on both sides of the projection 21B are continually elevated along the wall surfaces toward the top part (refer to FIG. 18*c*). The ink 1A continues its elevation while neutralizing the electrostatic charge in the projection 21B until the parts of the ink 1A coming up along both sides of the projection 21B are joined together at the top of the projection 21B and the projection 21B is entirely covered by the now continuous layer of the ink 1A as shown in FIG. 3*d*. Since the ink layer is of a thin thickness and light weight, the surface tension thereof can support the weight of the ink layer so that the layer can stay on the top of the projection 21B. Hence, as in the prior example, the ink will swell out of the grooves, however, in this case it is held on the projection rather than deposited directly from the grooves.

As described hereinabove, all of the projections opposing the needles of the multineedle electrode 5 applied by image signals are covered by the ink layer. While the applicator 2 is rotated in the arrow direction in FIG. 1, image signals are successively applied to the needles 5 and a pattern formed by the ink layer on the applicator in accordance with the image signals corresponds to the character or the like to be printed.

When the applicator 2 is rotated further, the projections 21 of the applicator are now forced against the recording paper 7, and the ink layer parts covering the tops of the projections are transferred onto the recording paper 7, thus obtaining a hard copy.

According to this embodiment, one of the important conditions for carrying out the printing process smoothly and for obtaining a good printing result is the scraping of the excessible ink. The liquid level for the ink 1A stored in the recesses 23 is determined in view of the following conditions:

(1) A sufficient difference in height must be maintained between the top of the projection and the liquid level so that when the recording paper is brought into contact with the top parts of the projections, the ink stored in the recesses is prevented from being sucked by the hair-like tissue on the surface of the recording paper;

(2) The liquid level must provide a distance sufficiently short so that the movement of the ink to the top parts is completed within the given charging and transferring period;

(3) The viscosity of the ink is varied by temperature, and the above described conditions must be satisfied by the ink at any temperature within the temperature variation range;

(4) It is required that the ink remaining on the top parts of the projections 21 be completely removed. The smooth surface of the some recording papers makes the transferring of the ink on the top parts easier but the complete removal of the ink out of the top parts is a strict requirement.

Practical examples of this embodiment were subjected to experiment. In all of the examples, the applicator 2 was provided with circumferential projections and grooves perpendicular to the axis of the applicator as shown in FIG. 17. The pitch of the grooves was selected at 125 microns, and the cross section of the top parts of the projections 21 was formed to be one part of a circle having a radius of 20 microns. The depth of the grooves was 60 microns. The applicator 2 was made of soft iron, and the nominal diameter thereof was 25 mm. The insulating layer 24, was made from a layer of high molecular substances as follows and having a thickness of 20 microns was coated over the entire surface of the applicator 2. The high molecular substances used in the examples were two-liquid polyurethane, epoxy resin, polyamideimido, and PVK. In either of the cases similarly satisfactory results could be obtained.

It was found that the vapor deposition of 10-micron thickness of selenium containing 0.5 wt% of arsenic could produce a similar result. The ink used in the experiment was made of liquid paraffin dispersed by carbon black as a pigment and adjusted to have a specific resistance of from $10^{-6}$ to $10^{-8}$ ohm-cm and a viscosity of 500 centipoise. The applicator was rotated at a peripheral speed of 125 mm/sec which is equal to the moving speed of the recording paper. The multineedle electrode 5 and the doctor blade 4 were placed at positions forming angles of 80° and 150°, respectively, from the contact point between the recording paper and the applicator. The rear side roll 22 was made of electrically conductive urethane rubber and applied by an appropriate voltage from 300 v to 500 v against the applicator 2. However, the rear side roll 22 might not be conductive, and the transfer of image could be obtained without application of the bias voltage.

According to this embodiment, the diameter of ink dots printed on the printing paper may be changed by varying the voltage applied to the needle electrode, and therefore images of intermediate tone can be obtained. In another modification, the ink image on the applicator is once transferred to another transferring roll, and then transferred again from this roll to the printing paper.

In the above description, the printing operation has been completed by one passage of the printing paper 7 between the applicator 2 and the rear side roll 22. However, it is also possible to use a plurality of sets, each set comprising an applicator and a rear side roll. The sets are disposed along the path of the recording paper, each said set will perform one part of the printing as in the second embodiment. The printing operation will be complete when the recording paper is subjected to the treatment by all of the sets.

According to this embodiment, the electrostatic attraction applied to the liquid ink can be selected to a far stronger value, and therefore an ink having a higher viscosity than in the case of the ink-jet method can be used. Furthermore, the entire printing device can be constructed in a small size. Since the multineedle electrode, is widely used in facsimile technique and can be utilized without extensive modification the construction cost of the printing device can be substantially reduced. Hence it is possible to have each color in a color printing device supported on each set. Multicolor printing is therefore possible.

Referring now to FIGS. 19–23 another preferred embodiment of the invention is shown. In this embodiment spiral back electrodes are divided not less than the number of spiral grooves on the applicator. A drum is arranged on the surface of the applicator and the electrodes are disposed on the drum. The drum and the applicator are rotated at the same speed so that the contact positions between drum and applicator do not coincide.

Referring now to FIG. 19 a polarity ink developing system will first be described. Applicators 31 comprise two banks 43 of a suitable material and are provided on a conductive substrate 45 with ink supplying member 44 contained in a groove formed therebetween. An electrode 5 is provided opposite the groove on the back of paper 7. When a voltage is not applied between the substrate 45 of the applicator 41 and the back electrode 5 so that an electric field does not act on the ink 44 in the groove, the surface of the ink 34 in the groove is recessed as shown in FIG. 19A. Hence, the ink will not be brought into contact with the recording paper 7 with the result that the recording paper is not printed. Since the electric field starts to act so that the ink 44 is polarized by means of electrostatic induction with the result that the ink is attracted to the electrodes 5, the ink is moved along the banks 43 (FIG. 19B) so that it adheres at the end thereof to the recording paper 7 (FIG. 19C).

Figure 19A:
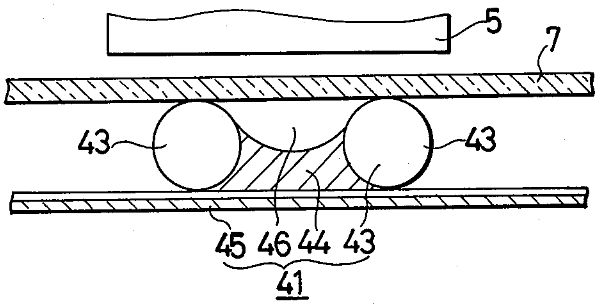
FIGS. 19A, 19B, 19C and 19D are views describing a polarity ink developing process used for this invention.
Figure 19B:
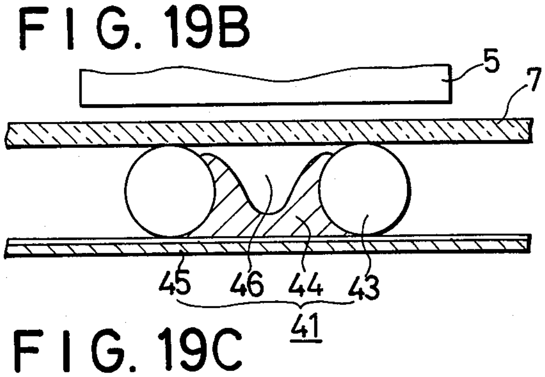
Figure 19C:
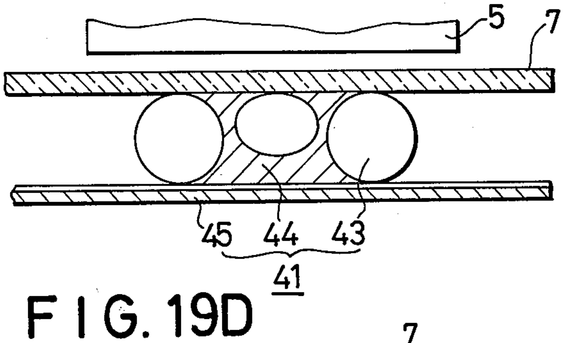
Figure 19D:
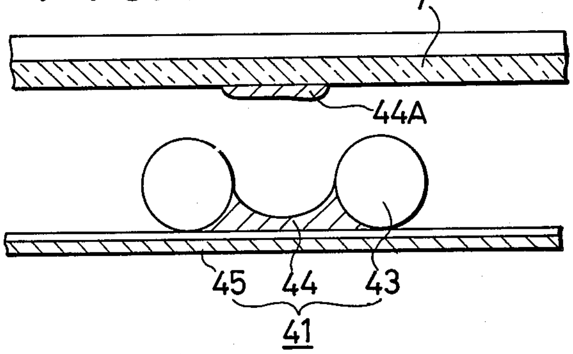

If the recording paper 7 is thereafter separated from the applicator 41, the ink 44A is retained on the recording paper 7 (FIG. 19D). The ink 44A thus retained is immersed into the interior of the paper and the solvent in the ink is evaporated so that the ink is solidified. It is to be noted that the grooves on the surface of the applicator 41 may be formed by cutting the groove on the conductive cylindrical column or by winding two filaments in parallel in spiral state on the column.

Figure 20:
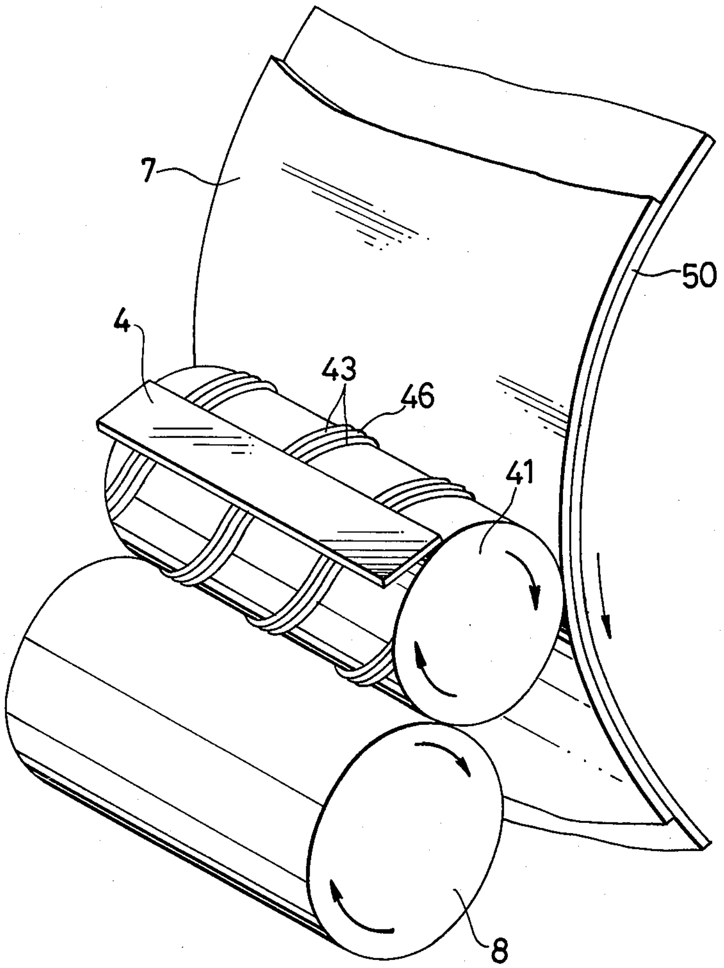
FIG. 20 is a schematic perspective view of a fourth preferred embodiment of this invention.

FIG. 20 shows a schematic view of one preferred embodiment of this invention, wherein the same reference numerals and characters as those in FIG. 19 indicate the same or equivalent components as or to that in FIG. 19. The applicator 41 is composed of the banks 43 of two filaments arranged in spiral state in parallel on the surface of the cylindrical substrate and grooves 46 are formed between the banks 43. Element 50 is a drum on which surface a recording paper 7 is wound and brought into contact through the paper 7 with the applicator 41 to rotate at the equal peripheral speed to that of the applicator 1. It is formed with spiral back electrodes thereon as will be hereinafter described in greater detail. The ink is supplied from an ink supply roll 8 onto the applicator 41 and excessive ink is scraped off by a doctor blade 4 made of elastomer so that predetermined amount of ink is retained in the grooves 46 in the banks 43. Accordingly, the relative position relationship shown in FIG. 19A is held on the tangent where the applicator 41 is brought into contact with the drum 50.

When a signal voltage is applied to the back electrodes provided on the surface of the drum 50, picture elements (dots) are printed on the position on the corresponding recording paper as was described with regard to FIG. 19. As is clear, the aforementioned printing process allows execution merely on the tangent where the applicator 41 is brought into contact with the spiral back electrodes formed on the surface of the drum so but will not place except on the tangent.

Figure 21A:
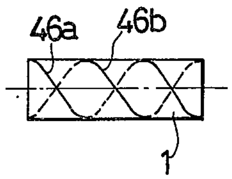
FIGS. 21A, 21B, 21C and 21D are plane and development views showing the position relationship between the position of the grooves on the surface of the applicator and the back electrodes on the surface of the drum.
Figure 21B:
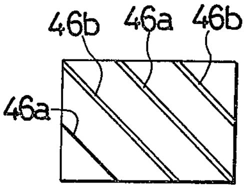
Figure 21C:
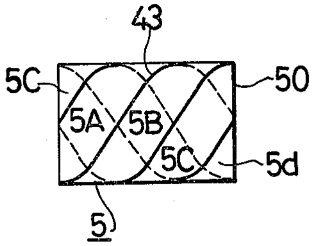
Figure 21D:
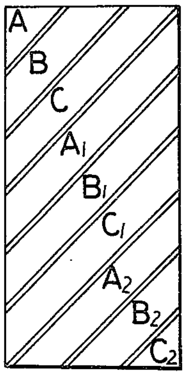

It is necessary in this embodiment that the grooves on the applicator 41 be sufficiently separated from each other. The position relationship between the spiral back electrodes formed on the drum 50 and the grooves on the applicator 41 is shown in FIG. 21. Two grooves 46*a* and 46*b* of the applicator 41 are formed on the surface of the cylindrical column in a spiral arrangement as shown in FIG. 21A. FIG. 21B shows the development view of the grooves 46*a* and 46*b*. The back electrodes 5 provided on the surface of the drum 50 are formed as spiral electrodes 5A, 5B, . . . insulated from each other (three in this example) as shown in FIG. 21C so that signal voltages are respectively applied. Reference numeral 43 indicates the boundary between the electrodes, and FIG. 21D shows the development view of the electrode surfaces. A1-A2-A3 correspond to the electrode 5A, while other electrodes 5B, 5C, . . . are similarly formed. When the drum 5 is brought into contact with the applicator 41, the respective electrodes on the drum are disposed opposite to the respective grooves on the applicator 41.

It is to be noted that although FIG. 21 show the example where the spiral angle of the grooves 46*a*, 46*b* and spiral electrodes 5A through 5C is 45°, the spiral angle of the grooves and spiral electrodes and number of divided electrodes may suitably be selected within the scope of this embodiment. Although both the pitches of the spiral angles may not always be equal, it is preferable to select at a ratio of more than 1:2. The respective electrodes approach two grooves when the groove 46*a* or 46*b* of the applicator 1 is brought into contact with the vicinity of the boundary of the two spiral electrodes in case where the pitches are equal. Hence the signal voltage is applied to the ink of the groove which is not supposed to be applied with the signal voltage originally. The result is that the ink will adhere to the groove which is not to be originally printed. This difficulty is eliminated if the number of electrodes is more than twice the number of grooves.

The printing process now will be particularly described in case of solid printing. The applicator 41 formed as described above is rotated in the state brought into contact with the drum 50 with a recording paper 7 wound therearound and a voltage is applied between all the back electrodes 5A through 5C and the applicator 41. The grooves 46 on the applicator 41 are always brought into contact with the drum 50 at three portions so that ink is always pulled out of the grooves of the applicator 1. Hence, the pattern shown in FIG. 22 is printed on the recording paper 7 when the applicator 41 is rotated by one revolution around the drum 50. Reference character L indicates the length of the recording paper 7 along the peripheral direction of the drum 50 and W is the width of the recording paper 7 in perpendicular direction to the longitudinal direction of the paper 7.

The grooves on the surface of the applicator 41 do not return to the same position when the drum 50 formed with the back electrodes 5 thereon is rotated by one revolution. If the diameter of the drum 50 is slightly displaced from n-integer times of the diameter of the applicator 41, lines in parallel with the lines initially printed are continuously printed in the vicinity of the initial lines as shown in FIG. 22 if the drum 50 is rotated.

Figure 22A:
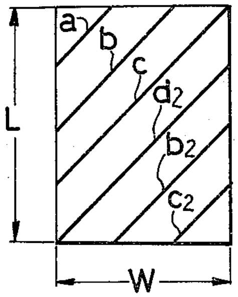
FIGS. 22A, 22B, 22C and 22D are views showing the process for solid printing executed according to this embodiment.
Figure 22B:
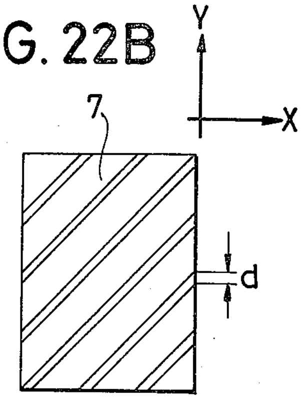
Figure 22C:
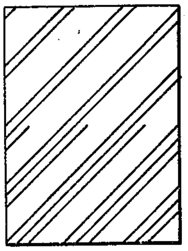
Figure 22D:
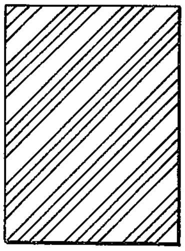

If the applicator 41 and drum 50 are continuously rotated under such conditions, the pattern shown in FIGS. 22C and 22D is obtained so as to finally provide solid printing. It will be understood that the relationship between the diameter of the applicator 41 and the diameter of the drum (back electrodes) of this case is not be limited to that as was described above. It may be any relationship of grooves on the applicator so long as they do not return to the same position as that on the drum even if the drum 50 is sufficiently rotated.

Figure 23A:
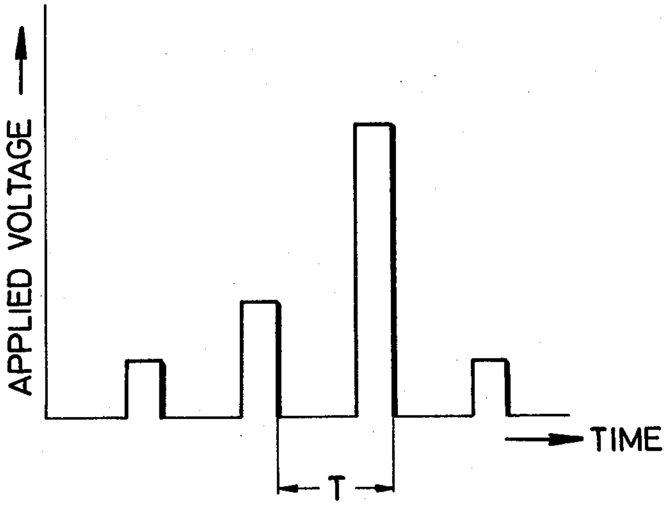
FIG. 23A is a view showing one example of the voltage pattern applied between the applicator and the back electrodes.
Figure 23B:
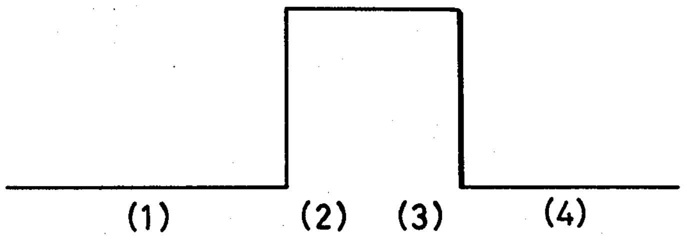
FIG. 23B illustrates the voltage corresponding to different operational states.

The situation of pictures and characters printed will now be described in detail. When the applicator 41 and drum 50 are rotated at an equal peripheral speed so that the applicator 41 is brought to predetermined picture element position at the position on the drum 50 brought into contact with the applicator 41, a voltage is applied to the corresponding back electrodes 5. The patter of the applied voltage is as shown in FIG. 23A, where reference character T indicates the time period corresponding to the picture element pitch. The pulse width is determined in response to the diameters of the applicator 41 and drum 50. The voltages designated at (1) through (4) in FIG. 23D correspond to the states shown in FIGS. 21A through 21D, respectively.

In experiments preferred parameters of this embodiment have been ascertained. The diameter of the applicator 41 was 250 mm and the spiral angle of the spiral grooves 46, 45°. Two grooves 46 were formed from two monofilaments of 100 $\mu$m in diameter spirally wound over the grooves 46 of the surface of the steel roll applicator 41 at an interval between the centers of the monofilaments of 300 $\mu$m. The diameter of the drum 50 formed with the back electrodes 5 was 125.1 mm, and the number of the electrodes spirally wound at 45° was twice the number of the grooves 46, i.e., four. The drum 5 for the back electrodes was made by bonding a flexible printed board to a cylindrical aluminum column. The contacting width of the applicator 41 with the back electrodes 5 on the drum 50 was approx. 0.5 mm. The peripheral speed of the applicator 41 and drum was 625 mm/sec. and the pulse period T of the applied voltage was 0.8 msec. The applicator 41 and drum 50 for the back electrodes were separately driven so that when the drum 50 was rotated by one revolution the same position of the applicator 41 was displaced by 0.5 mm in distance and 0.8 msec. in timing.

The voltage between the back electrodes 5 and the applicator 41 was adjusted in the range from 0 to 800 volts but could be raised up to 1,200 volts at maximum.

The ink was diluted from the printing ink with fluid paraffin and xylene so that its viscosity was to 120 cps at room temperature. When the drum 50 for the back electrodes was rotated in 50 revolutions as a voltage was applied to the respective electrodes 5 according to a control signal, the entirety was printed to take 60 seconds of required time. A hard copy of four-color printing was obtained in about four minutes by sequentially replacing the printing units in every color to face the units on the recording paper.

It is to be noted that the parameters of the respective printing processes in this embodiment may be suitably varied to print faster and an acceleration may be enabled further if the units of respective colors are always disposed. Since the diameter of the picture element dots to be printed is varied by changing the voltage applied to the back electrodes, halftone color may also be reproduced easily.

If a signal of scanning original picture is synchronized for application in addition to the color computer graphic picture instead of the ink jet printing machine, the picture of color film of 35 mm size, for example, can be enlarged to the sizes of A4 or B4 of JIS for printing. Multicolor or monochrome printing is accomplished by sequentially arranging a plurality of applicators for respective colors or the same colors and by successive contact with the recording paper.

It is apparent that other modifications of this invention can be accomplished without departing from the essential scope of the invention.

I claim:

1. A printing machine comprising; a supply of ink, a cylindrical applicator, a spiral groove formed on the peripheral surface of said applicator in a manner to define a helix around its axis; a doctor blade for maintaining a predetermined amount of ink in the groove of said applicator and for removing excess ink from the applicator; electrode means including a plurality of electrodes disposed opposite to the groove of said applicator; means for feeding recording paper at a speed related to the rotating peripheral speed of said applicator between said applicator and the electrode means; and, wherein the voltage responsive to the character signal is sequentially applied to the electrode means to thereby contact the ink in the groove with the recording paper to print the character.

2. A printing machine as defined in claim 1, wherein the recording paper is intermittently fed, and the electrode means are disposed in parallel with a bus line of said applicator; wherein a voltage is applied to the electrode means while the recording paper is stopped to print the paper.

3. A printing machine as defined in claim 1, wherein said recording paper is continuously fed and the electrode means are obliquely disposed with respect to a bus line of said applicator.

4. The printing machine as defined in claim 1, wherein said grooves make n contacts with said paper across a bus line of said applicator and said electrode means comprises at least 2 n electrodes disposed opposite to said grooves.

5. The printing machine as defined in claims 1, 2, 3 or 4 wherein said recording paper is advanced at a speed slower than the rotating peripheral speed of said applicator.

6. The printing machine of claim 1, further comprising a second cylindrical applicator having a spiral groove formed on the peripheral surface and wherein said electrode means comprises two stylus electrode arrays arranged to face the surface of said applicators.

7. The printing machine of claims 1 or 6, further comprising means for controlling the radius of curvature of the recording paper running between the applicator and the electrode means.

8. The printing machine of claim 6, further comprising means to stagger the application of signal voltages to said stylus electrode arrays, said staggering determined by the time of the running paper running and the distance between the two arrays.

9. The printing machine of claim 1, wherein said electrode means comprises a series of spiral back electrodes formed on said means for feeding recording paper.

10. The printing machine of claims 1 or 9, wherein said spiral groove on said applicator is formed by a series of parallel wires on said applicator.

11. The printing machine of claim 10, wherein the spiral angle on the spiral grooves on said applicator is equal to the spiral angle of said spiral back electrodes.

12. The printing machine of claim 11, wherein the number of back electrodes is more than twice the number of grooves.

13. A printing machine comprising; an ink tank containing a supply of ink, a cylindrical applicator rotatable in the ink tank; said applicator having formed in its surface a plurality of grooves for retaining ink therein, a doctor blade for metering the ink retained in the grooves, and a counter electrode having a stylus electrode array arranged to face the surface of the applicator and extending axially of the applicator; said counter electrode causing the ink in a groove to swell when signal voltages corresponding to a character to be recorded are applied thereto, thereby recording ink dots on a recording paper running between the applicator and the counter electrode.

14. A printing machine as set forth in claim 13, further comprising a plurality of printing units each comprising an applicator, a doctor blade, and a counter electrode are arranged such that the grooves formed in the respective applicator surfaces cannot be arranged in a line, and the signal voltages applied to the counter electrodes facing to the respective applicators are staggered by the time of the recording paper running the distance between two counter electrodes so that the combination of the ink dots marked on the recording paper by the respective printing units can establish a line of printing normal to the direction of travel of the recording paper.

15. A printing machine of claims 13 or 14, wherein said counter electrode comprises a stylus electrode array arranged to face the surface of the applicator and extend axially of the applicator for causing the ink in the groove or grooves to swell when signal voltages corresponding to an image to be recorded are applied thereto, and, means for controlling the radius of curvature of the recording paper running between the applicator and the counter electrode in the position of the recording paper coming into contact with the applicator, thereby rising ink dots on the recording paper.

16. A printing machine comprising; a cylindrical applicator having spiral grooves formed on the surface thereof, said applicator rotatable around its axis; a doctor blade for reserving predetermined amount of ink in the grooves of said applicator; a drum so disposed on the surface of said applicator as to be in contact at the peripheral surface thereof with the surface of said applicator; spiral back electrodes divided into not less number than that of the spiral grooves on said applicator, said back electrodes disposed on the entire surface of said drum and insulated from each other when said applicator is brough into contact with said drum; means for applying a voltage responsive to the character signal to respective back electrodes, and means for rotating said applicator and drum at an equal peripheral speed, wherein when said drum is rotated one revolution, the position on said drum brought into contact with the groove on the surface of said applicator does not coincide with the previous position at a prior revolution.

17. The printing machine of claim 16, wherein the spiral angle of the spiral grooves on said applicator is equal to that of the spiral back electrodes on the surface of said drum, and the number of back electrodes is not less than that of the spiral grooves on the applicator.

18. The printing machine of claims 16 or 17, wherein the number of back electrodes is at least twice the number of spiral grooves on the applicator.

19. The printing machine of claim 18, wherein said grooves on said applicator are formed by a number of parallel wires laid on said applicator.

20. The printing machine of claim 19, further comprising means to apply ink to said applicator.

* * * * *